United States Patent [19]
Jones

[11] Patent Number: 5,666,901
[45] Date of Patent: Sep. 16, 1997

[54] BOW MOUNTED BOAT LATCHING MECHANISM

[76] Inventor: Ernie Clebeart Jones, Route #10 Box 6960, Nacogdoches, Tex. 75961

[21] Appl. No.: 564,892

[22] Filed: Nov. 27, 1995

Related U.S. Application Data

[63] Continuation-in-part of Ser. No. 113,195, Aug. 26, 1993, abandoned.

[51] Int. Cl.$^6$ ................................................... B63B 21/00
[52] U.S. Cl. ................................... 114/343; 280/414.001
[58] Field of Search ................................ 280/504, 508, 280/509, 414.1–414.3; 114/230, 231, 218–221, 343, 344

[56] References Cited

U.S. PATENT DOCUMENTS

| | | | |
|---|---|---|---|
| 843,458 | 2/1907 | Hoos | 114/231 |
| 3,060,885 | 10/1962 | Nolf | 114/230 |
| 3,938,829 | 2/1976 | Anderson | 280/414.1 |
| 3,963,263 | 6/1976 | Whitlock | 280/414.1 |
| 4,463,965 | 8/1984 | Lawson | 280/414.1 |

FOREIGN PATENT DOCUMENTS

| 913984 | 3/1954 | Germany | 114/230 |
|---|---|---|---|

*Primary Examiner*—Edwin L. Swinehart

[57] ABSTRACT

A boat launching and retrieving device is disclosed for use on a boat and trailer. The device includes an upright angle iron mounted on the boat trailer. The fastening device is mounted at the top forward end of the boat so that the boat and trailer can be securely held together, then released for launching from within the boat and retrieved and secured also from within the boat.

3 Claims, 2 Drawing Sheets

BOW MOUNTED BOAT LATCHING MECHANISM

This application is a continuation-in-part of application Ser. No. 08/113,195, filed Aug. 26, 1993, now abandoned.

BACKGROUND OF THE INVENTION

1. Field

This invention relates to a device designed for launching and retrieving boats, which is adapted for use on the boat with a securing bar on the boat trailer.

2. Description of the Related Art

The present use of the winch and tow cable in launching and retrieving a boat requires at least two people. The person operating the winch and tow line is often required to get in the water to successfully accomplish this task. The person navigating the boat into alignment with the boat trailer can find the task extremely difficult in rough waters.

To overcome the above difficulty, an object of this invention is to provide a boat launching and retrieving device that is economical of construction and is simple and easily operated. Another object of this invention is to provide a boat launching and retrieving device that can be adapted to varying sizes of boats. Still another object of this invention is to provide a boat launching and retrieving device that will not require a person to get wet in the launching and retrieving process. Yet another object of this invention is to provide a boat launching and retrieving device which does not require the use of a winch and tow cable. Another object of this invention is to provide a boat launching and retrieving device that will secure the boat to the boat trailer. And still another object of this invention is to provide a boat launching and retrieving device that has a roller mounted to allow for securing the boat in differing depths of water.

Related devices include U.S. Pat. Nos. 3,938,829; 3,963,263; 3,060,885.

SUMMARY OF THE INVENTION

The boat launcher and retriever of this invention generally consists of a flat metal plate secured to the top front portion of the boat, attached to this metal plate is a shock absorber and two metal guide bars that contain a roller, at the forward edge of the guide bars metal pieces are welded forming the jaws which are pressed open by the "V: shaped upright angle iron carried by the boat trailer.

DESCRIPTION OF THE PREFERRED EMBODIMENT

Figure 1:
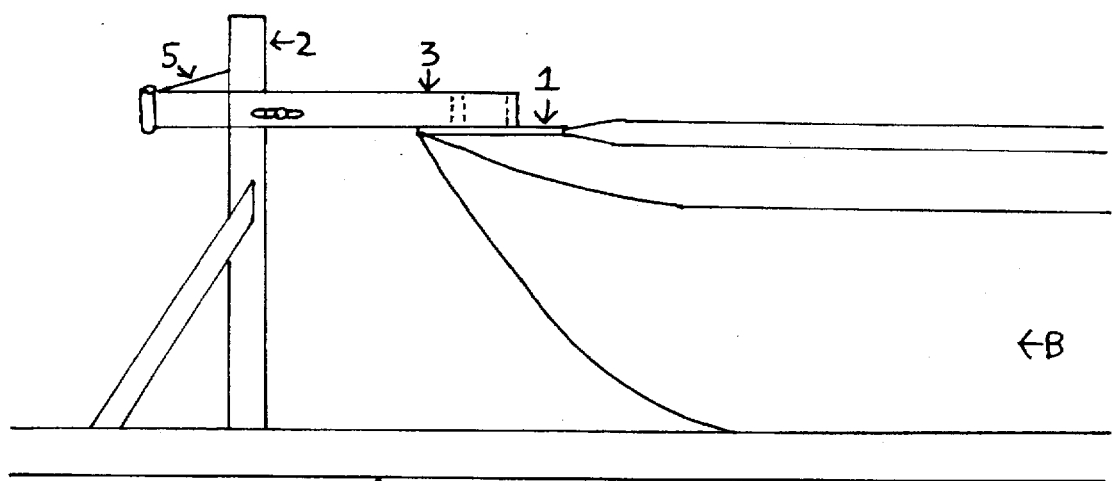
FIG. 1 is a side view of the boat on the boat trailer with the "V" shaped upright angle iron engaged within the jaws of the boat launcher and retriever. The "V" point of the angle iron faces the boat.
Figure 2:
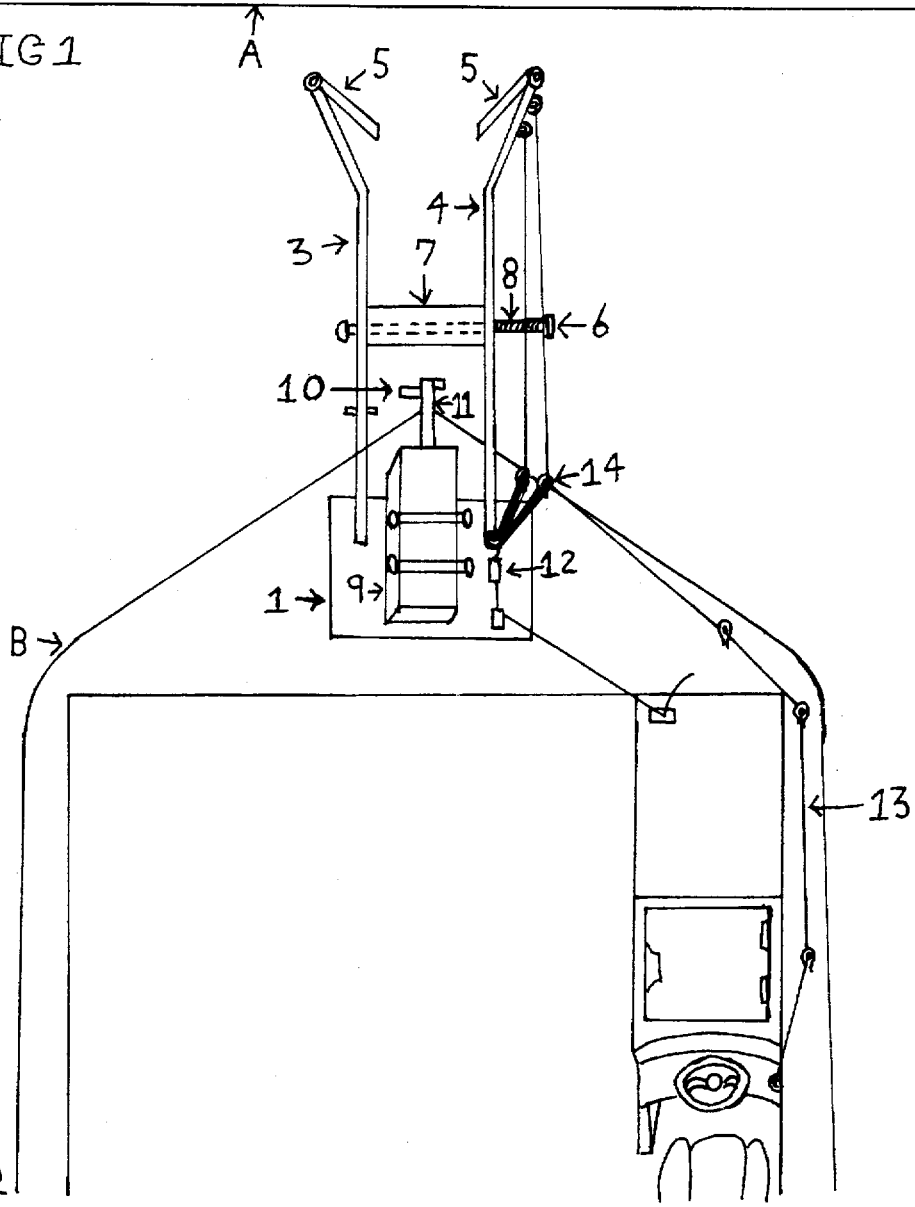
FIG. 2 is a top view of the boat launching and retrieving device secured to the top front of the boat showing the main structure of the boat launcher and retriever.

Reference B indicated any size boat. As shown in FIG. 1 the "V" shaped upright angle iron 2 is permanently secured to the boat trailer A. FIG. 2 shows more details of the invention. Note that a flat metal plate 1 is secured to the top forward portion of boat B in the most suitable method, according to materials and construction of B. Other essential parts are fastened to metal plate 1.

The left guide bar 3 is welded to 1 and is a stationary bar. The front portion of bars 3 and 4 are bent outwardly and the jaws 5 are welded to this portion of bars 3 and 4. As shown in FIG. 2 guide bars 3 and 4 have a slotted section which accommodates bolt 6 and roller 15. These slots allow roller 15 to move back and forth when the "V" shaped upright angle iron 2 enters jaws 5 and strikes it as boat B is loaded onto boat trailer A.

The right guide bar is pivotally mounted to the right front of flat metal plate 1 by means of bolt 23 mounted from the underneath side of flat metal plate 1 and welded thereto. Pipe 30, which is welded to the end of guide bar 4, fits over bolt 23 and is secured with a washer and nut thus allowing guide bar 4 to pivot outward to receive "V" shaped upright angle iron 2. Spring 7 mounted on bolt 6 keeps pressure on guide bar 4, closing it after "V" shaped upright angle iron 2 passes jaws 5.

Figure 3:
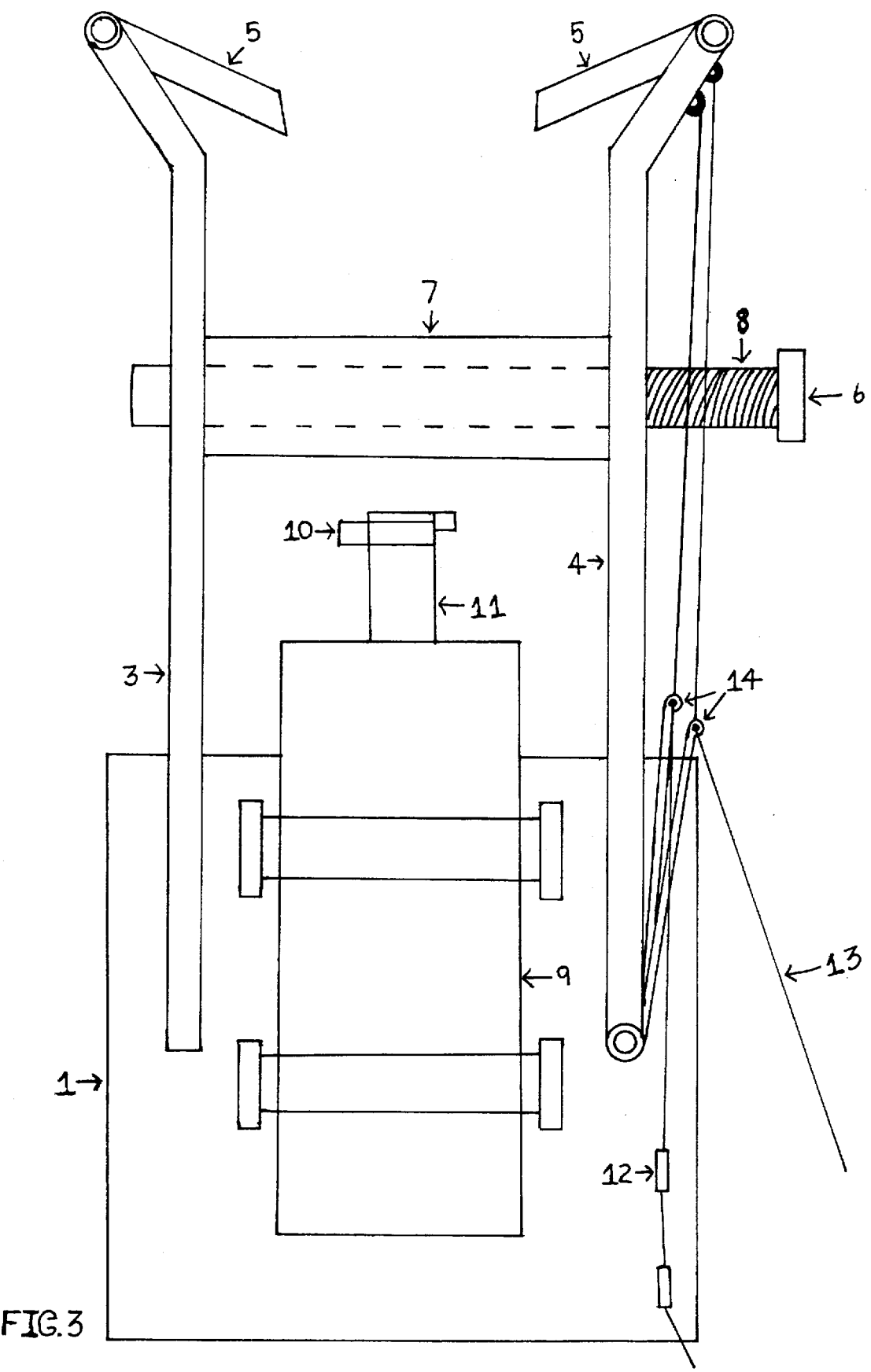
FIG. 3 is an enlarged view of the flat metal plate that attaches to the top front portion of the boat and the portion of the boat launcher and retriever attached thereto, shown along line 2 of FIG. 2.

As shown in FIG. 3 shock absorber 14 is mounted on metal plate 1 and secured by two metal strips 19 bolted to metal plate 1 by bolts 20. Shock absorber 14 is also braced by an angled metal strip 22 against the end of shock absorber 14. Also note FIG. 3 metal strip 18 is bolted to the end of the plunger on shock absorber 14 and held in a downward position by nut 21. Roller 15 will contact metal strip 18 and soften the shock on impact as the hook up is made. FIG. 2 shows cables 10 attached by means of eyelets 17 near the forward edge of the portion of bar 4 that is bent outwardly. One section of cable 10 is threaded through eyelets 17 spaced along the boat as needed to guide it to a convenient place for manual operation by the person operating the boat. The second cable 10 leads to the 12 volt Solenoid with pull plunger 24 that is mounted near the upper right corner of flat metal plate 1. Cable 10 is attached to the plunger of Solenoid 24 and when switch 28 is activated cable 10 opens jaw 5 on guide bar 4. To disengage the boat the operator simply moves the boat forward very slightly, gives the boat a slight move to the left and backs it off into the water. As further shown by FIG. 3 Solenoid 24 has a ground wire 26, an inline fuse 27 and wire 25 leads from Solenoid 24 to the switch 28 mounted in a convenient place for the boat operator. Wire 29 leads from switch 28 to the power source. FIG. 2 displays guide lights and signals to make loading the boat onto the boat trailer easier.

Guide light 8, a blue light, on guide bar 4 and light 9, a red light, on guide bar 3 are hooked up to the regular lighting system on the boat. Flags 16 are mounted on top of guide bars 3 and 4.

FIG. 1 displays a red light 12 on top of the "V" shaped upright angle iron 2 to make night time loading easier. This is connected to the lighting system on the boat trailer and has a manually operated switch.

I claim:

1. A boat and launching and retrieving device for automatically latching said boat to an upwardly extending bar of a boat trailer, comprising a flat metal plate attached to a top bow portion of said boat, a first slotted metal guide bar affixed to said plate and projecting forwardly of a forwardmost portion of said boat, a second slotted metal guide bar pivotally attached to said plate and projecting forwardly of the forwardmost portion of said boat, said first and second guide bars each supporting a metal jaw portion at the forward end thereof, said jaw portions being adapted to receive and latch onto said upwardly extending bar of said trailer upon the loading of said boat thereon.

2. The boat launching and retrieving device of claim 1, further comprising, a roller mounted on a bolt, said bolt being received in said slots of said first and second guide bars, a spring mounted on said bolt and biasing said second guide bar towards said first guide bar, a shock absorber secured to said flat metal plate and extending towards said roller, a plunger of said shock absorber having a metal extension thereon adapted to engage said roller.

3. The boat launching and retrieving device as set forth in one of claims 1 and 2, and further comprising a releasing system employing a solenoid plunger adapted to cause the release of said upwardly extending bar of said trailer from between the jaw portions of said first and second guide bars, as said second guide bar is caused to pivot away from said first guide bar upon actuation of said solenoid, and a manual releasing system employing a cable attached to said second guide bar, for causing said second guide bar to pivot away from said first guide bar when tension is applied to said cable.

* * * * *